United States Patent
Halbweiss et al.

(10) Patent No.: US 6,550,842 B1
(45) Date of Patent: Apr. 22, 2003

(54) FOLDING TOP FOR A MOTOR VEHICLE

(75) Inventors: Thomas Halbweiss, Marbach (DE); Berthold Klein, Rutesheim (DE); Frank Neubrand, West Bloomfield, MI (US); Wojciech Wezyk, Sindelfingen (DE)

(73) Assignee: CTS Fahrzeug Dachsysteme GmbH, Korntal-Munchingen (DE)

( * ) Notice: Subject to any disclaimer, the term of this patent is extended or adjusted under 35 U.S.C. 154(b) by 0 days.

(21) Appl. No.: 09/831,710
(22) PCT Filed: Nov. 4, 1999
(86) PCT No.: PCT/EP99/08438
§ 371 (c)(1),
(2), (4) Date: Aug. 9, 2001
(87) PCT Pub. No.: WO00/29236
PCT Pub. Date: May 25, 2000

(30) Foreign Application Priority Data

Nov. 14, 1998 (DE) .......................................... 198 52 615

(51) Int. Cl.⁷ ................................ B60J 7/00; B60J 7/08
(52) U.S. Cl. .................... 296/116; 296/107.09; 296/118
(58) Field of Search ....................... 296/107.01, 107.09, 296/116, 118, 121, 122

(56) References Cited

U.S. PATENT DOCUMENTS

| | | | | |
|---|---|---|---|---|
| 4,573,732 A | * | 3/1986 | Muscat | 296/116 X |
| 4,929,015 A | * | 5/1990 | Bauer | 296/122 X |
| 6,237,986 B1 | * | 5/2001 | Neubrand et al. | 296/116 X |

* cited by examiner

Primary Examiner—Dennis H. Pedder
(74) Attorney, Agent, or Firm—Crowell & Moring LLP

(57) ABSTRACT

An automobile convertible top for an automobile which can be adjusted between a closed position and a folded-down position has a convertible-top mechanism and a convertible-top fabric which is supported by the convertible-top mechanism. A side bar, is comprised of two limbs arranged at an angle and, in the side region of the convertible-top mechanism, is held by a joint having a first axis and a second axis which runs at an angle to the first axis. The side bar is arranged on the convertible-top mechanism such that, in the folded-down position, one limb of the side bar is with respect to the longitudinal direction of the vehicle. The end side of the limb which is remote from the joint faces toward the side region lying opposite the joint. To improve the seal for a convertible top in the region of the side windows, the pivotable side bar is configured as a single-part component and one limb of the pivotable side bar, in the closed position of the convertible top, extends as far as a window frame of the windshield.

9 Claims, 3 Drawing Sheets

FOLDING TOP FOR A MOTOR VEHICLE

BACKGROUND OF THE INVENTION

This application claims the priority of PCT International No. PCT/EP99/08438 filed in Europe on Nov. 4, 1999 and, German Patent Document filed in Germany on Nov. 14, 1998, the disclosures of which are expressly incorporated by reference herein.

The present invention relates to a convertible top for an automobile, and more particularly to a convertible top which is adjustable between a closed position and a folded-down position, comprising a convertible-top mechanism, a convertible-top fabric supported by the convertible-top mechanism, a side bar of the convertible-top mechanism which comprises two limbs arranged at an angle, of which one limb is vertical in the closed position in the side region of the convertible-top mechanism, is held pivotably of a joint arranged on a vehicle body, and has a first axis and a second axis running at an angle to the first axis, in which, in the folded-down position, one limb of the side bar runs transversely with respect to the longitudinal direction of the vehicle, and that end side of the limb which is remote from the joint faces toward that side region of the convertible-top mechanism which lies opposite the joint.

DE-C 943 747 has discloses an automobile convertible top which can be adjusted between a closed position, in which the vehicle interior is closed off, and a folded-down position. The automobile convertible top includes a convertible-top fabric which is held taut on a convertible-top mechanism which comprises a plurality of transverse and side bars. The side bars are of two-part configuration, having a first bar part, which is bent into the form of part of a circle, is held on a joint and is mounted so that it can rotate about two axes, and a second, horizontal bar part, which adjoins the first bar part via a rotary joint. In the closed position, the two bar parts span a side window. The second, horizontal bar part is connected to a front roof bar which is used to produce the connection to the window frame of the windshield.

To open the known convertible top, the bent part of the bar is pivoted about its two axes, and in the folded-down position the bent part of the bar lies transversely with respect to the longitudinal direction of the vehicle and faces in the direction of the opposite side of the convertible top. At the same time, the horizontal part of the bar is rotated through approximately 180°, about its joint axis, relative to the first bar part, so that in the folded-down position that end side of the horizontal bar part which is remote from the joint and is connected to the front roof bar is oriented oppositely to the bent part of the bar.

In the front section of the convertible top, the convertible-top fabric can only be attached to the horizontal bar part and to the front roof bar. On account of the bar being angled twice in the folded-down position, it is not possible for the convertible-top fabric also to be attached to the bent part of the bar which spans the rear side edge of the side window. Otherwise, the fabric, on account of the angled folded-down position of the bars, would undergo excessive stretching and damage the material. The fabric can only be attached to the front mechanism of the convertible top—the roof bar and the horizontal bar part which spans the top edge of the side window. By contrast, in the region of the bent part of the bar, it is impossible to provide a fixed connection with the fabric material, and this has an adverse effect on the seal in the transition from the bent part of the bar to the side edge of the side window.

The sealing problem is intensified further by the fact that, between the edge of the window and the side bar, the seal is divided into two parts, one for the upper edge and one for the side edge, and that in the region of adjacent end sides of the seal there is a risk of the sealing action being lost.

Another adjustable convertible top for a vehicle has been described in DE 196 46 035 A1. The convertible top has a pivotable side bar which engages partially around a side window of the vehicle and is held in such a manner that it can pivot about a horizontal transverse axis running transversely with respect to the longitudinal axis of the vehicle. During the transfer movement from the closed position into the folded-down position, the side bar describes part of a circle, and in the folded-down position the bar extends a relatively long way back toward the trunk, a fact which has to be correspondingly taken into account when dimensioning the compartment.

SUMMARY OF THE INVENTION

An object of the present invention is to improve the seal of a convertible top in the region of the side windows.

According to the invention, this object has been achieved by providing that the pivotable side bar a single-part component, and the horizontal limb of the side bar, in the closed position of the convertible top, extends as far as a window frame of the windshield and is held directly on the window frame.

The two limbs of the pivotable side bar, in particular a horizontal limb and a bent limb, form a single-part component, with the result that the number of degrees of freedom is reduced and possible sources of problems are eliminated. With this configuration, only one bar of the convertible-top mechanism need engage over both the rear edge and the upper edge of a side window, so that it is possible to produce a continuous, uninterrupted seal between window and side bar. The seal is attached to the side bar. Aging phenomena in the sealing material or temperature fluctuations have a considerably reduced effect on the seal provided in the convertible top according to the invention, because there are no joints in the transition between the side edge and the upper edge of the side window.

The seal is also improved by connecting the fabric material to the side bar over the entire length of the latter, so that in the closed position of the convertible top the fabric material is held securely on the side bar both at the rear edge and at the upper edge of the side window. There is virtually no possibility of the fabric material distorting, which in the closed position may lead to leaks.

A further advantage is that unforeseeable and unexpected creasing in the fabric material during opening of the convertible top no longer occurs, at least to a reduced extent, because the fabric is attached to the convertible-top mechanism over a greater length compared to the prior art. Thereby, possible uncontrollable movements of the fabric are restricted. When it is being moved from the closed position into the folded-down position, the fabric material is always gathered up in the intended way, thus preventing undesirable kinks and increasing the service life of the convertible top.

In an expedient variant, the length of the horizontal limb of the side bar is no longer than half the width of the compartment into which the convertible top is lowered in the folded-down position. This has the advantage that the two side bars which span opposite side windows in the closed position can be stowed with end sides facing toward one another in the compartment without impeding one another.

As a result, the side bars can be configured mirror-symmetrically with identical kinematics on both sides of the convertible top, thus simplifying the configuration. A further advantage is that the convertible top takes up less space in the folded-down position, so that the compartment can be of smaller dimensions and more space is available for the trunk.

According to a currently preferred embodiment, the side bar is connected to a transversely running roof frame of the convertible-top mechanism, which frame, in the closed position, is held on the window frame of the windshield. The roof frame may be of multipart configuration, in particular in three parts, with one central and two side sections. The side sections are held on the central section of foldable joints, and the side bars are connected to the side sections. In the closed position, all sections of the roof frame are folded open in a row, corresponding to the shape of the window frame of the windshield, and form a load-bearing, inherently stable, generally arc-shaped bar. In the folded-down position, the side sections are folded together about the axis of their joints, resulting in a compact stowed arrangement.

According to another currently preferred embodiment, the front roof frame can be eliminated by producing the connection between the window frame of the windshield and the convertible top, in the closed position, exclusively by way of the side bars, which also provide the required transverse tensioning of the fabric material. This configuration is distinguished by being of very low-weight and also taking up a very small amount of space in the folded-down position.

Figure 1:
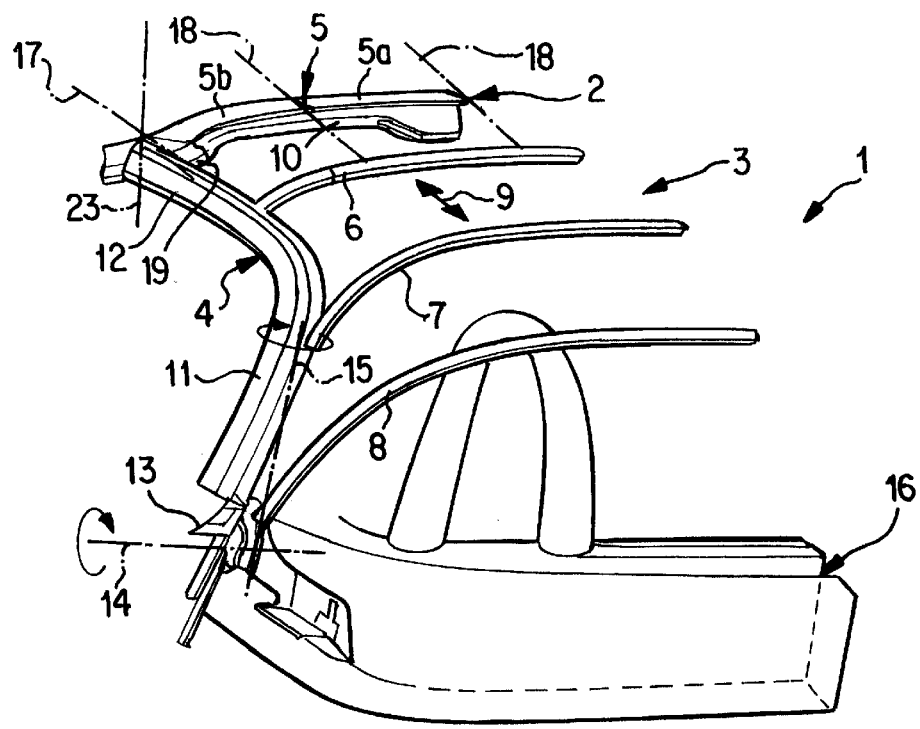
FIG. 1 is a perspective view of a convertible top according to the present invention in the closed position.

The convertible top 1 illustrated in FIG. 1 can be adjusted between the shown closed position 2 and a folded-down position, in which the convertible top 1 is stowed in a compartment 16. The convertible top 1 comprises a convertible-top mechanism 3, having a plurality of kinematically linked mechanism parts 4 to 8, and a convertible-top fabric, which is not shown in the figure and is attached to the convertible-top mechanism 3.

DETAILED DESCRIPTION OF THE PREFERRED EMBODIMENTS

The convertible-top mechanism 3 comprises a side bar 4 arranged in the window region, a front, transverse roof frame 5 and various support bows 6, 7 and 8, which extend transversely with respect to the longitudinal direction 9 of the vehicle or with respect to the direction 9 of adjustment, between the side bar 4 and an opposite side bar (not shown in FIG. 1) on the other side of the vehicle.

In the closed position 2, the convertible top 1 is connected to a window frame 10 of the vehicle windshield. The convertible top 1 expediently has only one degree of freedom for opening and closing the top; all further possible movements of the convertible top are kinematically forced and are dependent on this degree of freedom.

However, it may also be expedient to provide at least two degrees of freedom for the convertible top, in that in particular lateral inward pivoting of the side bars and translational forward and backward folding in the longitudinal direction of the vehicle are permitted as independent possible movements, which are preferably to be actuated by one drive in each case.

The side bar 4, which is of single-part configuration, comprises two connected limbs, namely a limb 11 which extends approximately vertically in the closed position 2 and a horizontal limb 12. The two limbs 11, 12 of the side bar 4 include an angle of approximately 90°. The dimensions of the side bar 4 are selected in such a way that a side window of the motor vehicle is completely covered by the limbs 11, 12 of the side bar 4 both over a rear, vertically running edge of the window and over its upper, horizontally running edge. In the closed position, the free end side of the horizontal limb 12 extends as far as the window frame 10 of the windshield, so that in the closed position, with the side window closed, all the exposed edges of the side window are covered by only one mechanism part, namely the side bar 4.

The side bar 4 is held at a joint 13 which is arranged on the vehicle body and allows two possible movements: a rotational movement about a horizontal axis of rotation 14 and a rotational movement about an axis of rotation 15 which runs at an angle to the horizontal axis of rotation 14. The two axes of rotation 14, 15 may intersect or cross one another; the axes of rotation include in particular an angle which is slightly smaller than 90°. The axis of rotation 15, in the closed position 2, is slightly inclined toward the inside of the vehicle with respect to a vertical.

The rotational movements about the two axes of rotation 14, 15 are expediently coupled, so that in the event of an adjustment movement of the convertible top, which is triggered manually or by a motor, in the longitudinal direction 9 of the vehicle, the side bar 4 executes a three-dimensional, kinematically forcibly guided rotational movement with simultaneous rotation about both axes of rotation 14, 15. This three-dimensional rotational movement allows the side bar 4 to move out of the closed position 2, in the plane of the side window, toward the folded-down position, in which the side bar 4 is stowed in a horizontal plane in the compartment 16 and the end side of the horizontal limb 12 of the side bar 4 lies transversely with respect to the longitudinal direction 9 of the vehicle and points in the direction of the opposite side of the vehicle or convertible top.

The fabric of the convertible top is attached to the side bar 4 over the entire length of the side bar—to the vertical limb 11 and to the horizontal limb 12, as well as in the transition between the two limbs—so that a tension acting on the convertible-top fabric can be built up and maintained continuously along the length of the side bar. This reduces the risk of the fabric material becoming creased on account of nonuniform distribution of stress which may cause leaks and, moreover, conceal the risk of stress peaks which may lead to the fabric being damaged. A further advantage of the continuous attachment of the convertible-top fabric to the side bar is the reduction of driving noise.

In addition, a seal in the form of a sealing lip is attached to the side bar 4 on that side of the side bar which faces toward the side window. The seal can be configured as a single part over the length of the side bar, thus avoiding sealing problems in the transition between the limbs 11 and 12 of the side bar 4. Moreover, the production and assembly costs are reduced both for the seal and for the side bar itself.

The end side of the horizontal limb 12 is connected by a joint to the front, transversely running roof frame 5, a first axis 17 of the joint 7 between the horizontal limb 12 and the roof frame 5, in the closed position 2, running parallel to the longitudinal axis 9 of the vehicle, and a second joint axis 23 running parallel to the vertical axis of the vehicle.

The roof frame 5, which in the illustrated embodiment in the closed position 2 is held on the window frame 10 via the side bars 4 with the aid of a closure 19, has three sections, namely, a central section 5a and two outer, side sections 5b, only one of which is illustrated in FIG. 1. The side sections 5b are each foldably connected, in each case via a joint, to the central section 5a. The joint axes 18, in the closed position 2 of the convertible top, run approximately parallel to the longitudinal axis 9 of the vehicle. A seal, which in the closed position 2 is acted on over the length of the window frame 10 by the roof frame 5, is attached to the window frame 10. The convertible-top fabric is attached to the roof frame 5, likewise over the entire length of the roof frame 5, as measured in the transverse direction.

As an alternative or in addition to side closures, a central closure in the middle of the roof frame can be provided. Instead of being attached to the window frame, the seal may also be arranged on the roof frame.

In some cases, it may be expedient for the front roof frame 5 to be of single-part configuration or to dispense with the roof frame altogether. In the latter case, the tension in the fabric material in the front section of the convertible top, in the closed position, is applied to the fabric material by the side bars or the transverse force which is generated by the side bars and is directed outward. A tension cable may be secured between the side bars, which in the closed position is guided over the window frame of the windshield and on which the convertible-top fabric is held.

Support bows 6, 7 and 8 are held on the side bars 4, which support bows extend transversely with respect to the longitudinal direction 9 of the vehicle, over the vehicle interior, and run parallel to the front roof frame 5. The support bows 6 to 8 produce additional tension in the fabric material and impart stability to the convertible top. In a similar way to the roof frame 5, the support bows 6, 7 are connected to the side bars by a joint. The support bars may be of single-part or multipart construction, in particular in three parts with joint axes which are parallel to the vehicle longitudinal direction and joint axes which are parallel to the vehicle vertical axis. In the illustration embodiment, the support bow 6 adjacent to the roof frame is of three-part construction, whereas the two support bows 7, 8 which are further away from the roof frame are of single-part configuration. If appropriate, the back support bow 8 is not held on the side bars, but rather is held directly on the convertible-top bearing.

Figure 2:
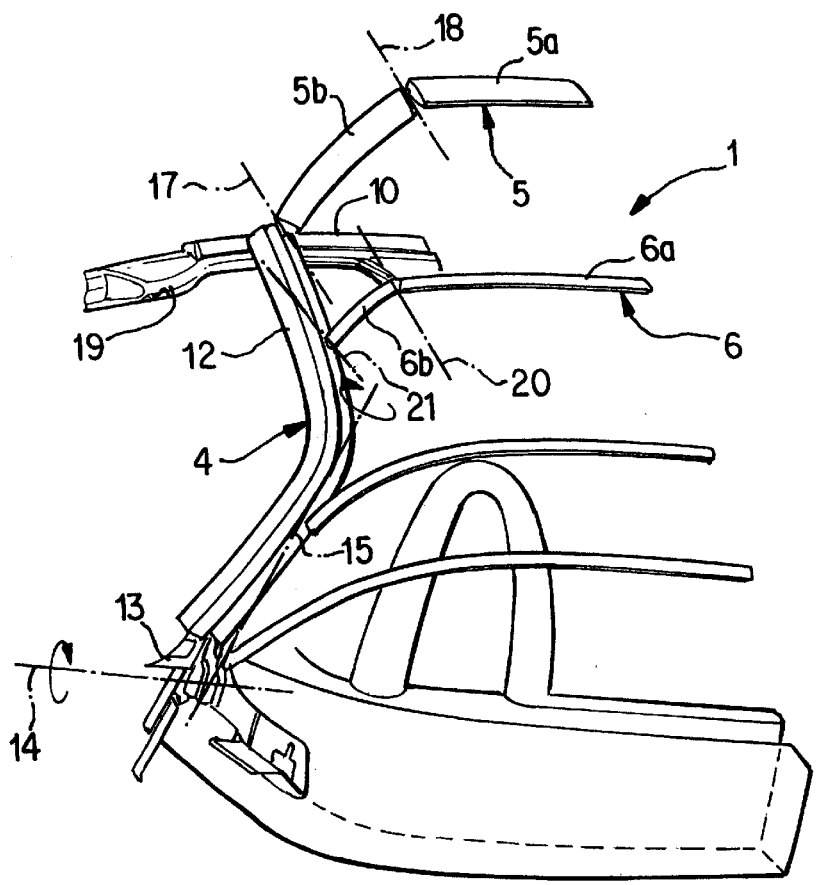
FIG. 2 to FIG. 5 show various intermediate positions of the convertible top between the closed position and the folded-down position.

FIG. 2 shows an intermediate position of the convertible top 1 after the closure 19 has been released and shortly after the movement from the closed position to the folded-down position has begun. The convertible top 1 has already been tilted slightly toward the folded-down position, in the longitudinal direction of the vehicle. The front roof frame 5 has been lifted off the window frame 10, and the side bar 4 has been partially pivoted about the rotation axes 14, 15 of the joint 13. In this tilted position of the convertible top 1, the end side of the limb 12 of the side bar 4 has been pivoted both toward the back and transversely, toward the vehicle interior, and also initially upward with respect to the closed position. The displacement in the transverse direction shortens the distance between the end sides of opposite side bars, this shortening inevitably leading to the sections 5a, 5b of the roof frame 5 being folded together about the rotation axis 18 and, moreover, in the side section 5b of the roof frame 5 at the same time rotating relative to the limb 12 about the axis of rotation 17.

At the same time, the support bow 6, which is likewise divided into three components, is folded about a rotation axis 20 running between the central and side sections 6a, 6b and a rotation axis 21 on the limb 12.

Figure 3:
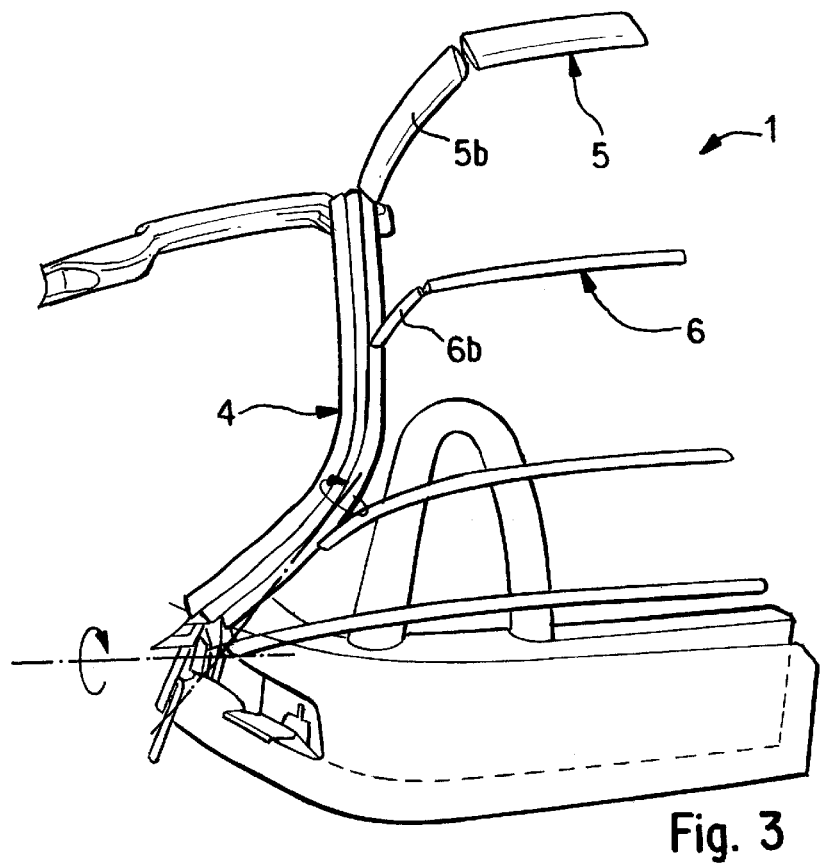
Figure 4:
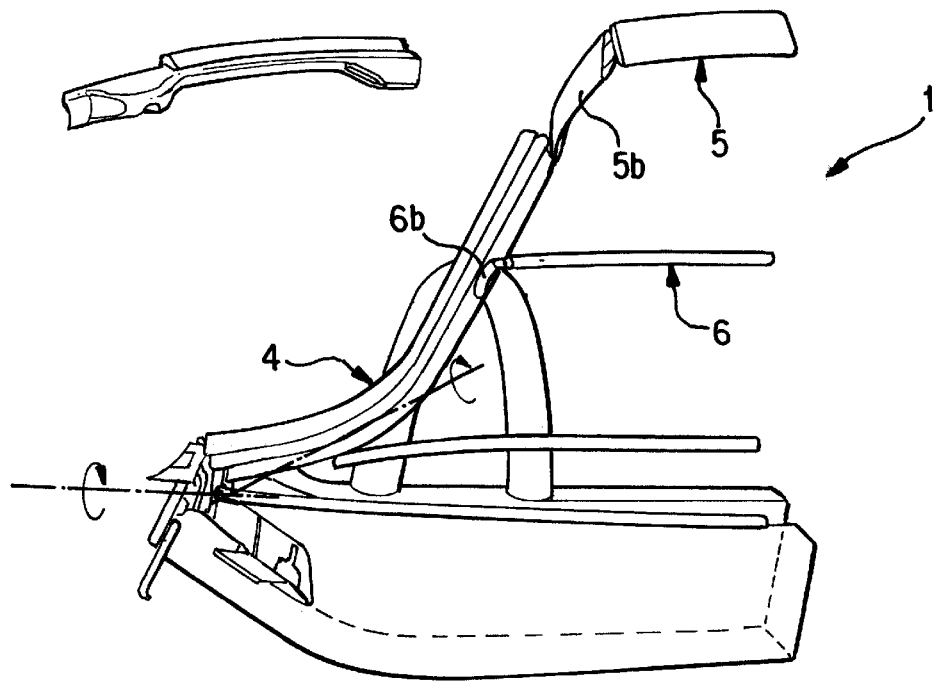

FIGS. 3 and 4 show further intermediate positions of the convertible top 1, in which it has been moved toward the folded-down position. The side sections 5b, 6b of roof frame 5 and bow 6 are increasingly moving out of an approximately horizontal position, in the closed position, into an increasingly vertical position.

As a result of the side bar 4 being folded in toward the vehicle interior and the bows 5, 6 being folded together, the tension acting on the fabric material of the convertible top is relieved, so that the fabric material can be folded down in the intended way.

Figure 5:
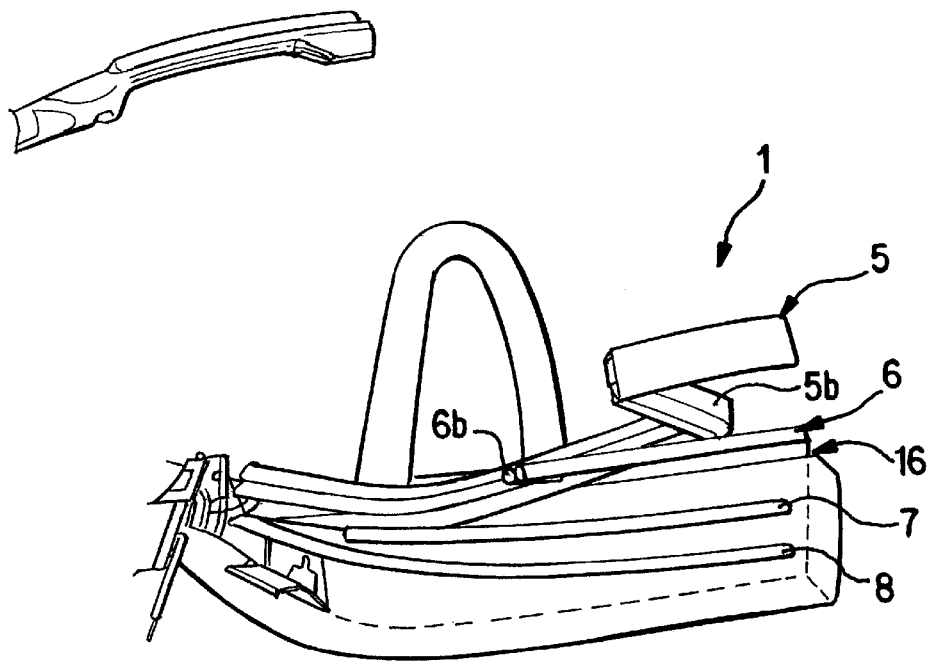

In FIG. 5, the convertible top 1 is already partially inside the compartment 16. The rear support bows 7, 8 have already substantially reached their final folded-down position in the compartment 16. The roof frame 5, which is split into three parts, and the bow 6 are folded together in a Z shape as a result of the side sections 5b and 6b, once they have passed their vertical position, being pivoted into a horizontal position in the folded-down position, the sections 5b, 6b being oppositely horizontally oriented in the folded-down position and in the closed position.

Figure 6:
FIG. 6 is a perspective view showing the convertible top in the folded-down position.
Figure 6:
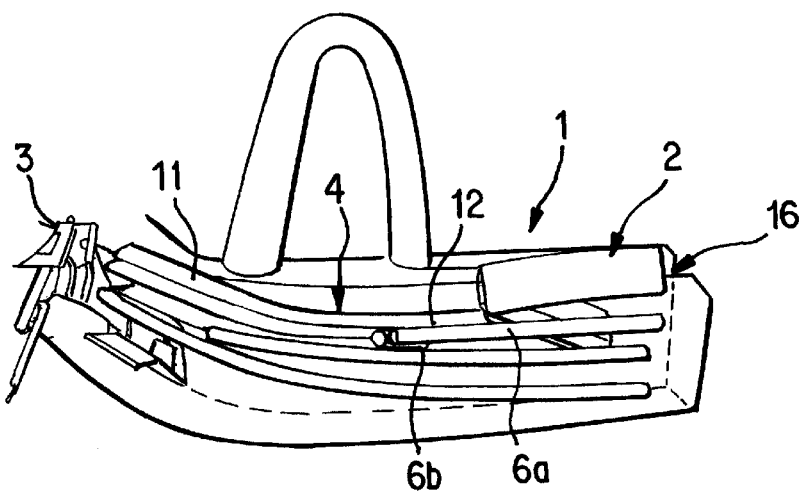

In FIG. 6, the convertible top 1 is in its folded-down position 22, in which the convertible top has been completely lowered into the compartment 16. If appropriate, the compartment 16 may be closed off by a lid or cover.

In the rear part of the convertible top, the fabric may be attached to the vehicle either loosely or securely. The convertible top shown is suitable in particular for two-seater vehicles, in which the side windows are shorter than half the width of the compartment for the convertible top, so that the side bars can be arranged with their horizontal limbs which engage over the top edge of the side windows at the same height in the folded-down position, mirror-symmetrically with respect to one another and without impeding one another.

The convertible top can be adjusted between the closed position and the folded-down position by hand or by electric motor apparatus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An automobile convertible top which is adjustable between a closed position and a folded-down position, comprising a convertible-top mechanism, a convertible-top fabric supported by the convertible-top mechanism, a side bar of the convertible-top mechanism which comprises two limbs arranged at an angle, of which one limb is vertical in the closed position in the side region of the convertible-top mechanism, is held pivotably of a joint arranged on a vehicle body, and has a first axis and a second axis running at an angle to the first axis, in which, in the folded-down position, one limb of the side bar runs transversely with respect to the longitudinal direction of the vehicle, and that an end side of the limb which is remote from the joint faces toward that side region of the convertible-top mechanism which lies opposite the joint, wherein the pivotable side bar is a single-part component, and the horizontal limb of the side bar, in the closed position of the convertible top, extends as far as a window frame of the windshield and is held directly on the window frame.

2. The convertible top as claimed in claim 1, wherein a length of one limb of the side bar corresponds to at most half the width of a compartment for the convertible top in the folded-down position.

3. The convertible top as claimed in claim 1, wherein one limb of the side bar is connected to a roof frame which runs transversely at the front and in the closed position is held on the window frame of the windshield.

4. The convertible top as claimed in claim 3, wherein the roof frame is divided into a central section and two side sections, the two side sections being foldably connected to the central section by one respective joint.

5. The convertible top as claimed in claim 4, wherein, in the closed position, the axes of the joints foldably connecting the two side sections to the central section run parallel to the longitudinal direction of the vehicle.

6. The convertible top as claimed in claim 1, wherein an end of one limb of the side bar, in the closed position, is held on the window frame of the windshield.

7. The convertible top as claimed in claim 1, wherein at least one support bow, which extends across a width of the convertible top, is held on one limb of the side bar.

8. The convertible top as claimed in claim 7, wherein the support bow is a single-part component.

9. The convertible top as claimed in claim 7, wherein the support bow is a multipart component.

* * * * *